(12) United States Patent
Whitenack et al.

(10) Patent No.: US 7,343,331 B2
(45) Date of Patent: Mar. 11, 2008

(54) METHODS AND SYSTEMS FOR MANAGING SUPPLY CHAIN PROCESSES

(75) Inventors: John David Whitenack, Mason, OH (US); Shawn Eric Holt, Springboro, OH (US); Jeffrey John Cismoski, Lake Geneva, WI (US); Margo Teetzel Moats, Cincinnati, OH (US); Matthew Duane Kress, Lebanon, OH (US); Francis Gerard Stepic, Amelia, OH (US); Paul Edward Johnson, Wilder, KY (US); Lanell Scot Gray, Southfield, MI (US); Craig Leonard Brocklehurst, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 689 days.

(21) Appl. No.: 09/900,737

(22) Filed: Jul. 6, 2001

(65) Prior Publication Data

US 2003/0009397 A1    Jan. 9, 2003

(51) Int. Cl.
*G06Q 30/00* (2006.01)
(52) U.S. Cl. .......................................... 705/28; 705/27
(58) Field of Classification Search ................ 705/22, 705/26, 27, 28, 29; 709/218
See application file for complete search history.

(56) References Cited

U.S. PATENT DOCUMENTS

| | | | |
|---|---|---|---|
| 4,799,156 A | 1/1989 | Shavit et al. | |
| 5,450,317 A | 9/1995 | Lu et al. | |
| 5,710,887 A | 1/1998 | Chelliah et al. | |
| 5,950,173 A | 9/1999 | Perkowski | |
| 5,970,475 A | 10/1999 | Barnes et al. | |
| 5,974,395 A | 10/1999 | Bellini et al. | |
| 6,023,691 A | 2/2000 | Bertrand et al. | |
| 6,049,787 A | 4/2000 | Takahashi et al. | |
| 6,058,373 A | 5/2000 | Blinn et al. | |
| 6,081,789 A | 6/2000 | Purcell | |
| 6,115,690 A | 9/2000 | Wong | |
| 6,157,915 A | 12/2000 | Bhaskaran et al. | |
| 6,170,249 B1 | 1/2001 | Blasé et al. | |
| 6,341,271 B1 * | 1/2002 | Salvo et al. .................. | 705/28 |

* cited by examiner

*Primary Examiner*—Gerald J. O'Connor
(74) *Attorney, Agent, or Firm*—William Scott Andes; Armstrong Teasdale LLP

(57) ABSTRACT

A web-based supply chain system manages internal users, suppliers, and external customers to improve business productivity. The web-based system includes a server, at least one computer, and a network that couples the computer to the server. The server is configured with a database of supply chain business information. The server also includes a plurality of user interfaces that are associated with business transactional applications. Furthermore, the server allows a user to access and retrieve the supply chain business transactional applications. The data is available for users, suppliers, and customers to view through a secure connection to a business entity's server system.

8 Claims, 11 Drawing Sheets

● A.I.D.C. (04398) ●
Supplier Ready-To-Ship (RTS) Buffer Zone Status

RTS List

| Part Number | Update Qty | Buffer Zone Req'd | RTS Qty | Coverage Percent | Coverage Commit Date or Comment | RTS Qty Last Changed On |
|---|---|---|---|---|---|---|
| | 0 | | Enter the number of "ADD" lines you want [1] | | | |

To add a new part, enter the part number and qty on the above line
To remove a part, enter the word "delete" in Update Qty column/s below

| Part Number | Update Qty | Buffer Zone Req'd | RTS Qty | Coverage Percent | Coverage Commit Date or Comment | RTS Qty Last Changed On |
|---|---|---|---|---|---|---|
| 1322M99G02 | | 2 | 12 | | | 04/10/2000 04:19:54 |
| 1380M14G11 | | 12 | 6 | | | 04/10/2000 04:19:54 |
| 1380M14G12 | | 12 | 1 | | | 04/10/2000 04:19:54 |
| 1380M42G11 | | 12 | 0 | | | 04/10/2000 04:19:54 |
| 1380M42G12 | | 12 | 0 | | | 04/10/2000 04:19:54 |
| 1559M30G06 | | 8 | 0 | | | 03/31/2000 09:18:19 |
| 1559M30G10 | | 30 | 0 | | | 03/31/2000 09:18:19 |
| 1559M40G03 | | 20 | 0 | | | 03/31/2000 09:18:19 |
| 1559M70G02 | | 7 | 3 | | | 04/10/2000 04:19:54 |
| 1804M44P03 | | 12 | 56 | | | 04/10/2000 04:19:54 |
| 1806M80G01 | | 8 | 29 | | | 04/10/2000 04:19:54 |

METHODS AND SYSTEMS FOR MANAGING SUPPLY CHAIN PROCESSES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

This invention relates generally to supply chain services, and more specifically to methods and systems for methods and apparatus for managing supply chain processes.

As manufacturing demands have increased, there also has been an increased need for assessing conditions to determine a status of components within a supply chain. Accurately assessing users and suppliers within the supply chain facilitates accurate potential shortfalls, delays, and delivery problems that may affect the overall manufacturing process.

A plurality of suppliers and users transact processes that impact the supply chain. Such processes include, but are not limited to, planning and scheduling, order management, inventory control, component manufacturing and testing, logistics, and billing and collecting. More specifically, although the overall manufacturing process may be the responsibility of one entity, the supply chain processes are typically performed by a plurality of different entities within the supply chain.

At least some known systems enable the entities performing supply chain processes to maintain data regarding the process. However, the various systems utilized by the plurality of supply chain entities may not be compatible, and as such, accurately monitoring the entire supply chain may be difficult. More specifically, because no known consolidated supply chain monitoring system exists, retrieving, updating, and monitoring supply chain data may be unproductive and time-consuming.

BRIEF SUMMARY OF THE INVENTION

In one aspect, the present invention is a web-based supply chain system for managing internal users, suppliers, and external customers to improve business productivity in a cost effective manner. The system includes a server, at least one computer, and a network that couples the computer to the server. The server is configured with a database of supply chain business information. The server also includes a plurality of user interfaces that are associated with business transactional applications. Furthermore, the server allows a user to access and retrieve the supply chain business transactional applications. The data is available for users, suppliers, and customers to view through a secure connection to a business entity's server system.

In another aspect, the present invention is a method for accessing supply chain system information by internal users, suppliers, and external customers using a supply chain web center system. The supply chain web center system includes a server and at least one client system. The method includes the steps of uploading user information to the server, uploading a plurality of supply chain process information to the server; uploading a plurality of business transactional applications to the server; downloading from the server, web pages configured to direct access to databases within the server, and using a business transactional application to access supply chain process information selected by a user from the databases within the sever.

In a further aspect, the present invention is a web-based system for managing a supply chain system. The web-based system includes a network, and a server. The server is coupled to the network and is configured with a database that includes a plurality of business applications including at least one of demand planning, planning and scheduling, configuration management, order management, procurement, component manufacturing, assembly and test, logistics, and billing and collection. The server controls access and retrieval of the business transactional applications.

BRIEF DESCRIPTION OF THE DRAWINGS

FIG. 5 is an exemplary embodiment of a planning and scheduling application web page accessible through the supply chain web-site shown in FIG. 4;

DETAILED DESCRIPTION OF THE INVENTION

Exemplary embodiments of systems and processes that facilitate remotely monitoring operational data from a plurality of different gas turbine plants are described below in detail. The systems and processes facilitate, for example, displaying equipment operational data files in graphical and tabular format. The systems and processes are not limited to the specific embodiments described herein, but rather, components of each system and each process can be practiced independently and separately from other components and processes described herein. Each component and process can also be used in combination with other components and processes.

Figure 1:
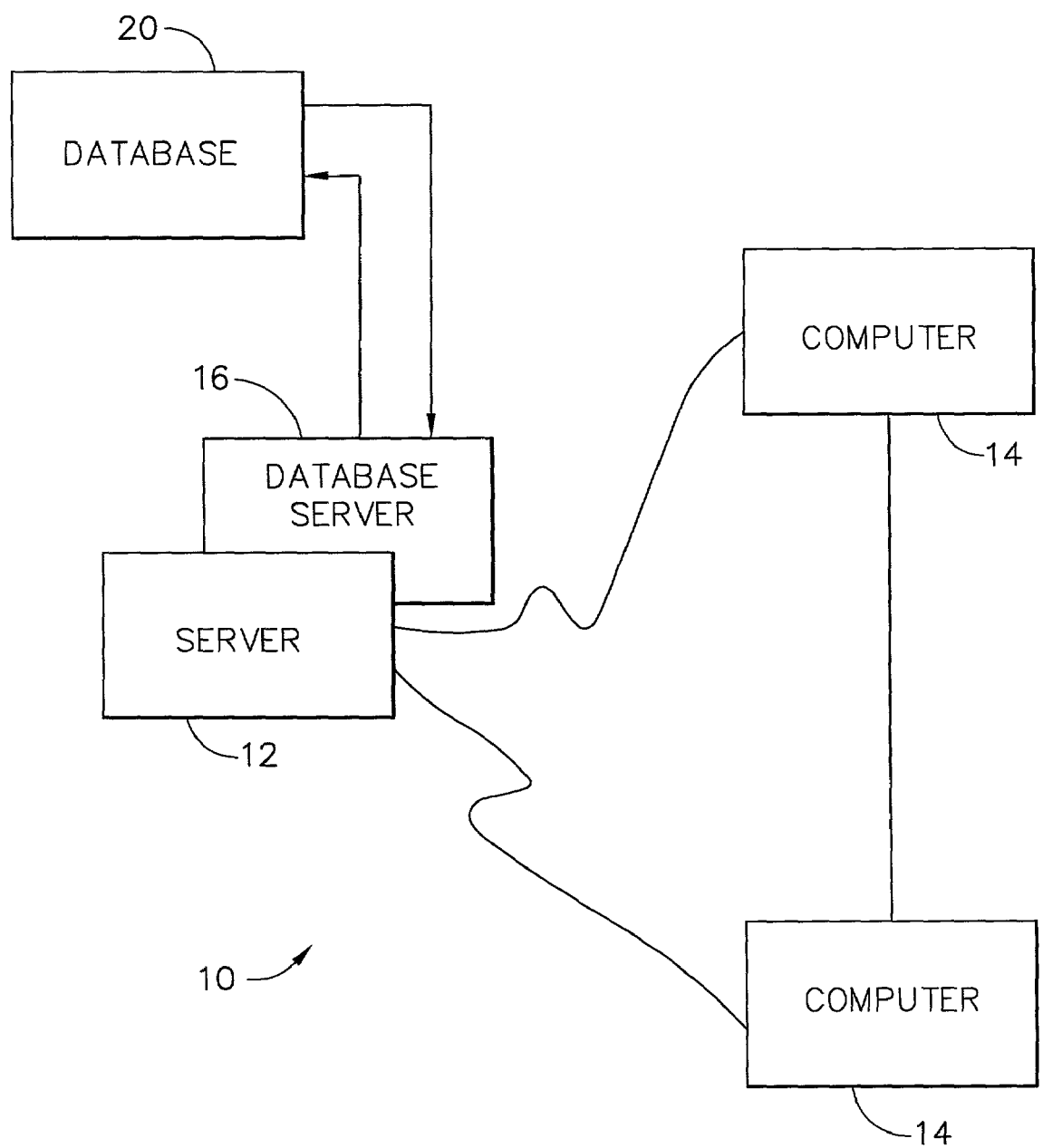
FIG. 1 is a system block diagram for a web-based supply chain system.

FIG. 1 is a system block diagram for a web-based supply chain system 10 for managing internal users, suppliers, and external customers to facilitate improving business productivity. In the exemplary embodiment, system 10 is a web-based supply chain used for managing internal users, suppliers, and external customers of aircraft engines and associated components. System 10 includes a server 12 and a plurality of devices 14 connected to server 12. In one embodiment, devices 14 are computers including a web browser, and server 12 is accessible to devices 14 via the Internet. In an alternative embodiment, devices 14 are servers for a network of customer devices. System 10 is coupled to a mass storage device (not shown). In the exemplary embodiment, server 12 includes a database server 16 coupled to a data storage device 20.

Devices 14 are interconnected to the Internet through many interfaces including through a network, such as a local area network (LAN) or a wide area network (WAN), through dial-in-connections, cable modems and special high-speed ISDN lines. Alternatively, devices 14 could be any device capable of interconnecting to the Internet including a web-based phone or other web-based connectable equipment. A database providing information relating to the plurality of plants is stored on server 12 and can be accessed by users at one of devices 14 by logging onto server 12 through one of devices 14.

System 10 is configured to provide various user interfaces whereby users access operational data from equipment monitored at the plurality of plants. Server 12 accesses stored information and downloads the requested operational data to at least one of the client systems 14, when the request to download is received from client system 14. The databases are accessed by users using client system 14 configured with a standard web browser.

Figure 2:
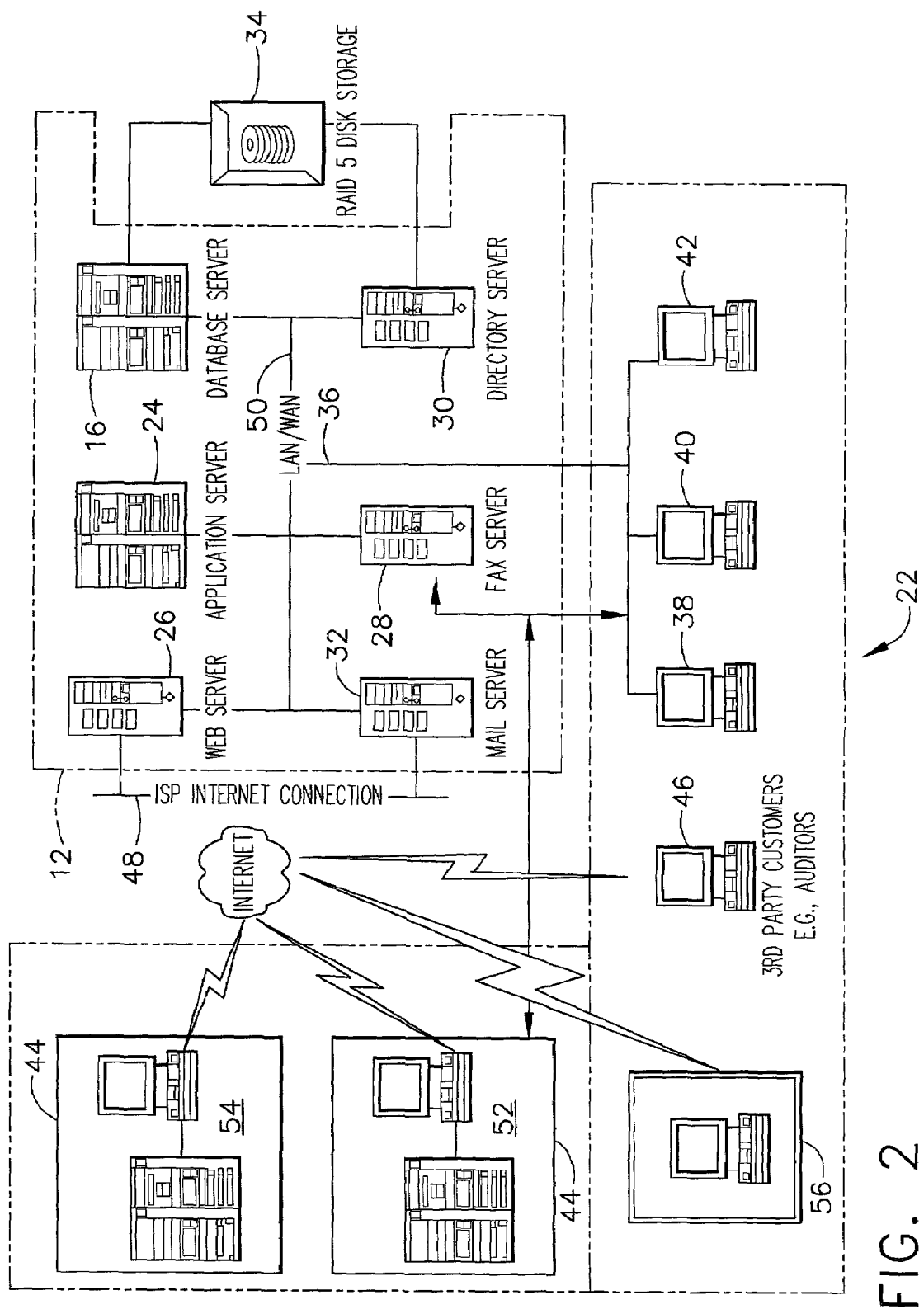
FIG. 2 is an expanded version block diagram of an exemplary embodiment of a server architecture of a web-based supply chain system.

FIG. 2 is an expanded version block diagram of an exemplary embodiment of a server architecture of a web-based supply chain system 22 for managing internal users, suppliers, and external customers of aircraft engines, and associated components. Components of system 22, identical to components of system 10 (shown in FIG. 1), are identified in FIG. 2 using the same reference numerals as used in FIG. 1. System 22 includes server sub-system 12 and user devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator workstation 38, a user workstation 40, and a supervisor workstation 42 are coupled to LAN 36. Alternatively, workstations 38, 40, and 42 are coupled to LAN 36 via an Internet link or are connected through an intranet.

Each workstation 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server sub-system 12 is configured to be communicatively coupled to various individuals or employees 44 and to users 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any authorized individual or an employee of the business entity having a workstation 52 can access server sub-system 12. One of user devices 14 includes a senior manager's workstation 54 located at a remote location. Workstations 52 and 54 are personal computers having a web browser. Also, workstations 52 and 54 are configured to communicate with server sub-system 12. Furthermore, fax server 28 communicates with employees located outside the business entity and any of the remotely located user systems, including a user system 56 via a telephone link. Fax server 28 is configured to communicate with other workstations 38, 40, and 42 as well.

Figure 3:
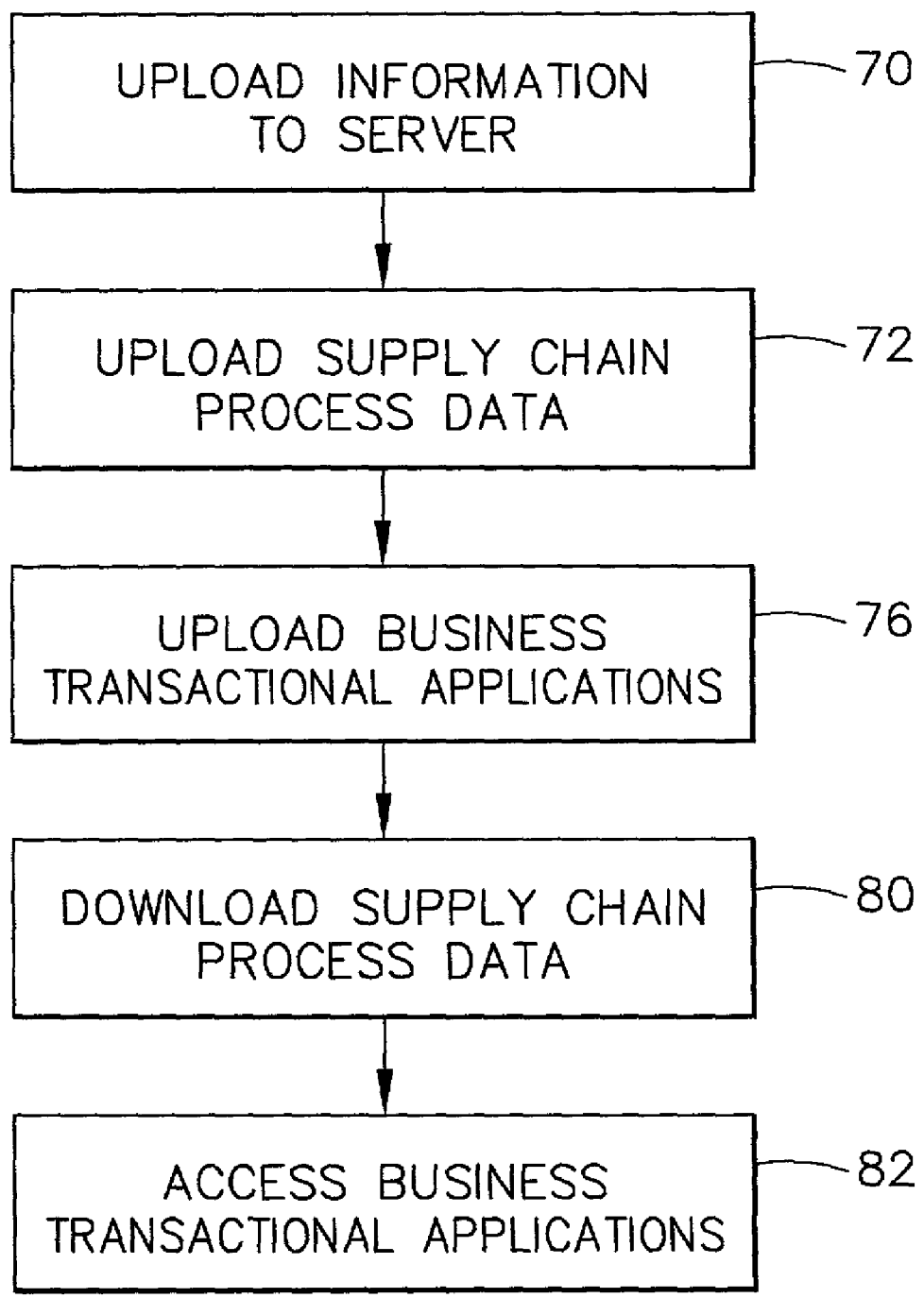
FIG. 3 is a flowchart illustrating one example embodiment of a method for accessing supply chain information using the web-based supply chain system shown in FIG. 1.

FIG. 3 is a flowchart illustrating one example embodiment of a method for accessing supply chain information using a web-based supply chain system, such as system 10 (shown in FIG. 1) or system 22 (shown in FIG. 2). Initially user information is uploaded to 70 to a server, such as server 12 (shown in FIG. 1). Additionally a plurality of supply chain process data is also uploaded 72 to the server. More specifically, a plurality of users within the supply chain may enter data that is relevant to each portion of the supply chain in which each user interacts.

A plurality of business transactional applications are also uploaded 76 to the server. In the exemplary embodiment, the business transactional applications include applications that are found in a common supply chain. Accordingly, the applications uploaded 76 are relevant to supply chain core processes, and include, but are not limited to, demand planning, planning and scheduling, configuration management, order management, procurement, component manufacturing, assembly and testing, logistics, and billing and collecting.

The supply chain data is then retrievable from the system and downloadable 80 from the server. More specifically, a plurality of web pages that are configured to direct access to databases within the server are accessible. The web pages enable a user to use a business transactional application to access 82 supply chain process data from the databases within the sever. In the exemplary embodiment, the web pages permit a user to set inventory requirements, monitor suppliers to determine shipping availability, download data for buying and related activities including, but not limited to, globalization, long-term agreements, and raw material purchasing, and to integrate data from a plurality of purchase databases. Other web pages that may be accessed enable a user to view summarized historical performance data in pre-defined categories, integrate future demand schedules based on historical data, and predict potential manufacturing short-falls based on historical data. Additional web pages that may be accessed enable a user to maintain process capability data for pre-determined part characteristics, and receive operational metrics for monitoring.

Figure 4:
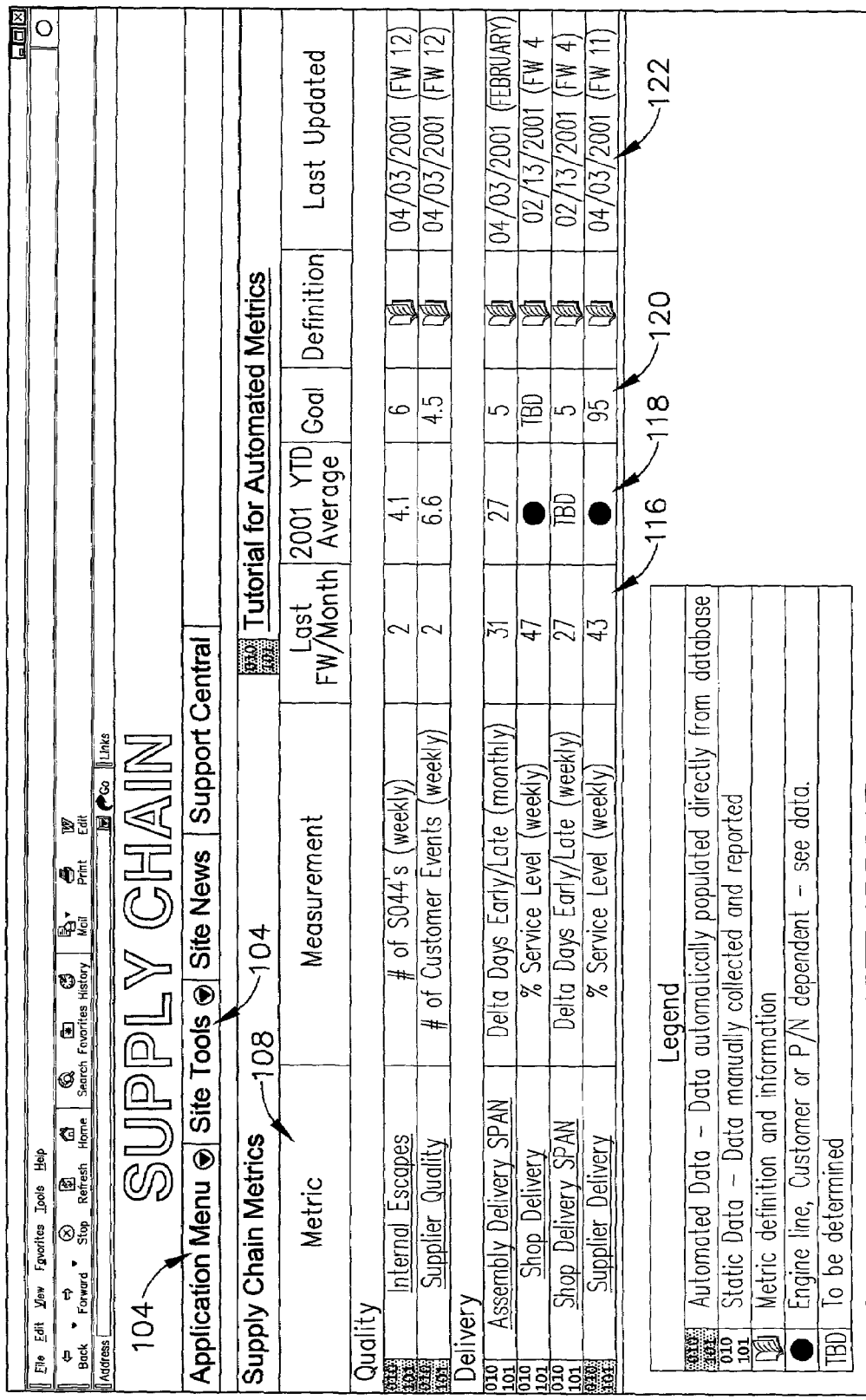
FIG. 4 illustrates an exemplary embodiment of a supply chain home page for use with the supply chain web-based system shown in FIG. 1.

FIG. 4 illustrates an exemplary embodiment of a supply chain home page 100 for the above-described supply chain web-based system. The supply chain system accumulates a variety of supply chain data from numerous supply chain processes, as well as business information, that is highly confidential. Supply chain home page 100 provides a portal for accessing such information, including a plurality of applications that are supply-chain related. Accordingly, home-page 100 has different access levels to control and monitor the security of the supply chain system. Authorization for access is assigned by system administrators on a need to know basis. In an alternative embodiment, access is provided based on job functions. In yet another embodiment of the invention, access is provided based on positions and management authority within the business entity. Editing capabilities within the system and web-site 100 are also restricted to ensure that only authorized individuals have access to modify or edit the information that is already existing in the system. These internal controls, with reference to system security, enable management and control of access to information within the supply chain system.

Home page 100 provides a single portal that is customized to individual client needs, and is configured to support a plurality of supply chain processes. Specifically, home page 100 provides a single entry point for a user to conduct all of their supply chain core processes. Web-site 100 creates a central repository of extranet applications for customers to access regarding common supply chain processes. Web-site 100 also combines new technology, supply chain process specific applications, and customer and industry supply chain data to give users an ability to increase their productivity and minimize their supply chain costs by running process applications that develop their optimal supply chain performance requirements. For example, in the exemplary embodiment, home page 100 enables a user access to nine supply chain processes, described in more detail below, that are found in a common supply chain. Included in the supply chain core processes are demand planning, planning and scheduling, configuration management, order management, procurement, component manufacturing, assembly and testing, logistics, and billing and collecting.

Home page 100 includes a plurality of pull-down menus 102 that enable a user to select a business process or to select a site tool. More specifically, an application pull-down menu 104 enables a user to select a business process application such as demand planning, planning and scheduling, configuration management, order management, procurement, component manufacturing, assembly and testing, logistics, and billing and collecting. Additionally, a site tools pull-down menu 106 enables a user to select from a standard suite of tools that are transferable to other users and that may be augmented by individual client applications. For example, in the exemplary embodiment, a supply chain metrics tool 108 has been selected and is displayed within home page 100. More specifically, metrics tool 108 provides a summary of key monitored supply chain parameters that indicate a difference between a current status of each parameter and a pre-determined goal unique to each parameter, thus enabling a user to accomplish demand planning.

Metrics tool 108 provides a metric column 110 that identifies each supply chain parameter being benchmarked against a metric. More specifically, parameters within column 110 are grouped according to business processes. For example, in the exemplary embodiment, a portion of metrics identified within column 110 are grouped as pertaining to quality, and a portion of metrics identified within column 110 are grouped as pertaining to delivery. A measurement column 112 provides a brief description of the benchmark to which each metric identified within column 110 is being compared. A last FW/Month column 116 indicates a value for the metric during the last reporting period or month, and a year to date average column 118 indicates an average value for the metric during the current calendar year. Additionally, a goal column 120 indicates a target or goal value for each metric. A definition column enables a user to hyperlink to a definition sheet that explains unfamiliar terms used within each metric. A last updated column 122 identifies a date that the data visible within each metric evaluation was last updated.

FIG. 5 through FIG. 11 illustrate example web pages for the above-described web-based monitoring system. The web-pages shown in FIGS. 5 through 11 are examples only and there are a plurality of variations possible. Through a series of user interfaces, a user is provided various useful supply chain data. FIGS. 5 through 11 illustrate the type of the information accumulated, stored, and updated on a regular basis to support various supply chain processes within the supply chain system.

The information contained in these user interfaces, ie., web-pages, is exemplary only and changes from one user to another. The information provided through the user interfaces depicted in FIGS. 5 through 11 is stored in a centralized database 20 (shown in FIG. 1) within data storage device 20 (shown in FIG. 1) and retrieved by server system 12 (shown in FIG. 1) as required. Many variations of particular user interfaces or web-pages viewable by the customer may be utilized. The following description refers to one set of web-pages that can be used to prompt the user to retrieve a variety of supply chain process data for managing internal users, suppliers, and external customers to facilitate improving business productivity. Of course, many variations of such web-pages are possible.

FIG. 5 is an exemplary embodiment of a planning and scheduling application web page 150 accessible through supply chain home page 100 (shown in FIG. 4). More specifically, web page 150 provides a tool for a user to accomplish planning and scheduling within the supply chain process. Through web page 150 a user may set, and input inventory on-hand requirements. Additionally, through web page 150 a user may monitor a supplier's availability to ship inventory that has been ordered. The availability to ship inventory may be input by, but is not limited to, a trading partner, or a sub-tier partner.

Figure 6:
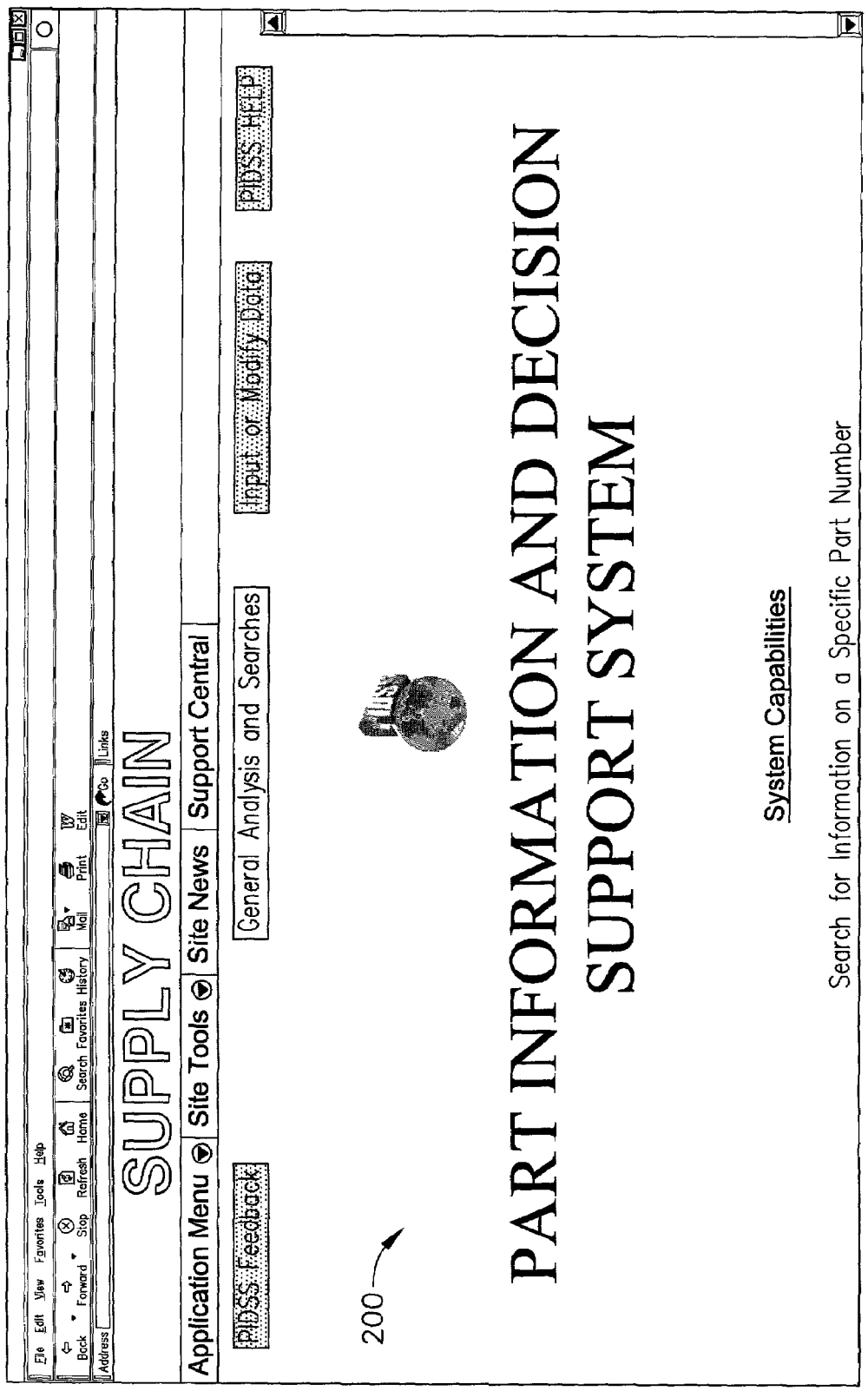
FIG. 6 is an exemplary embodiment of a configuration management application web page accessible through the supply chain web-site shown in FIG. 4.

FIG. 6 is an exemplary embodiment of a configuration management application web page 200 accessible through supply chain home page 100 (shown in FIG. 4). More specifically, web page 200 provides a user access to a sourcing system that enables a user to accomplish order management within the supply chain process. Web page 200 provides a sourcing system that provides supply chain data necessary for buying and related activities, including, but not limited to, globalization, long term agreements, and raw materials purchasing. More specifically, web page 200 enables data from multiple databases to be integrated, and allows the induction of appropriate user spreadsheets that are individually maintained.

Figure 7:
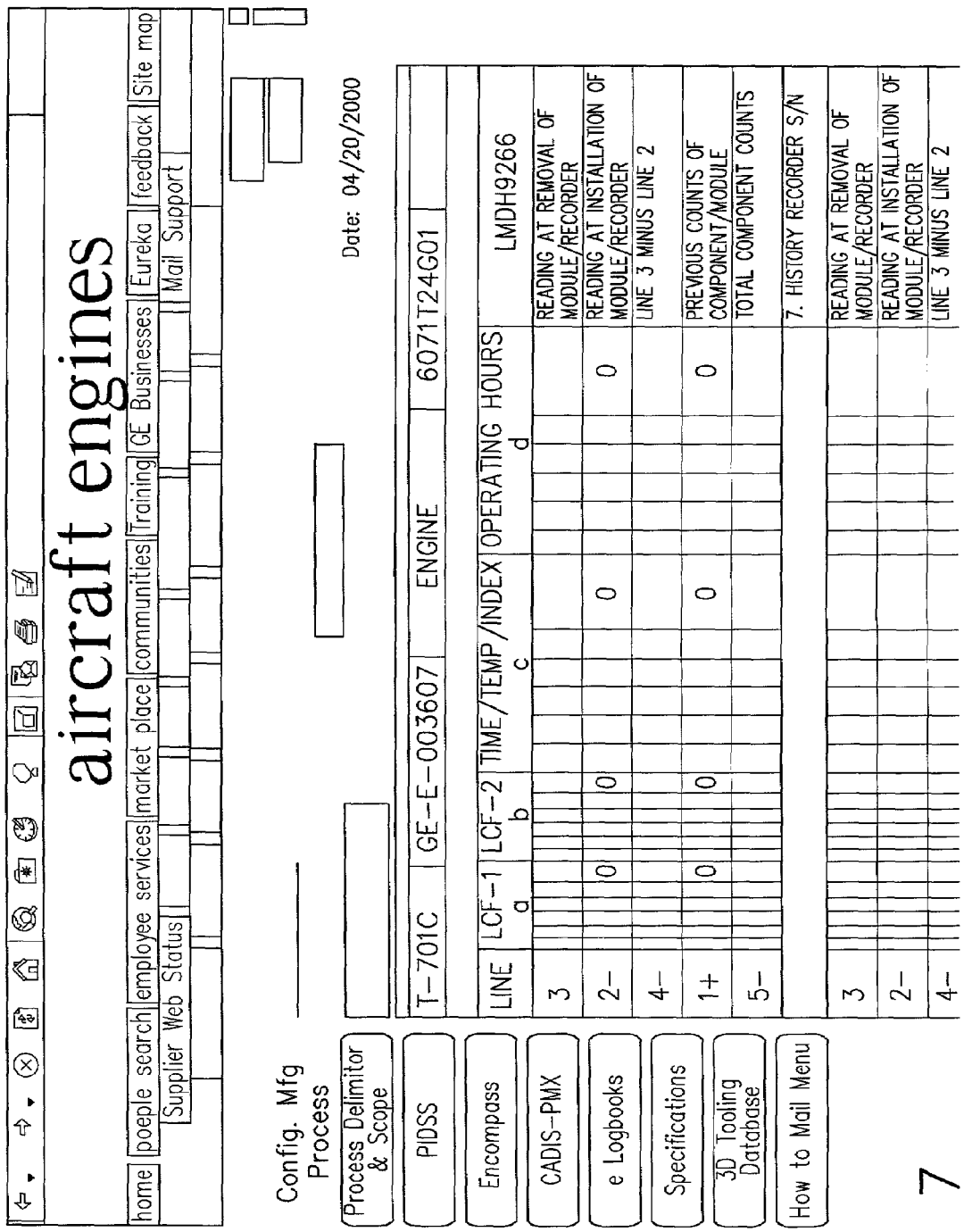
FIG. 7 is an exemplary embodiment of an assembly and test/configuration management application web page accessible through the supply chain web-site shown in FIG. 4.

FIG. 7 is an exemplary embodiment of an assembly and test/configuration management application web page 250 that is accessible through supply chain home page 100 (shown in FIG. 4). Web page 250 is used to perform configuration management within the supply chain process. In the exemplary embodiment, web page 250 provides a user access to an engine build-up configuration management application that provides a user with the capability to print hard copy, formatted prints from the Internet, or in the alternative, provides a user with on-line viewing capability for management of engine configuration.

Figure 8:
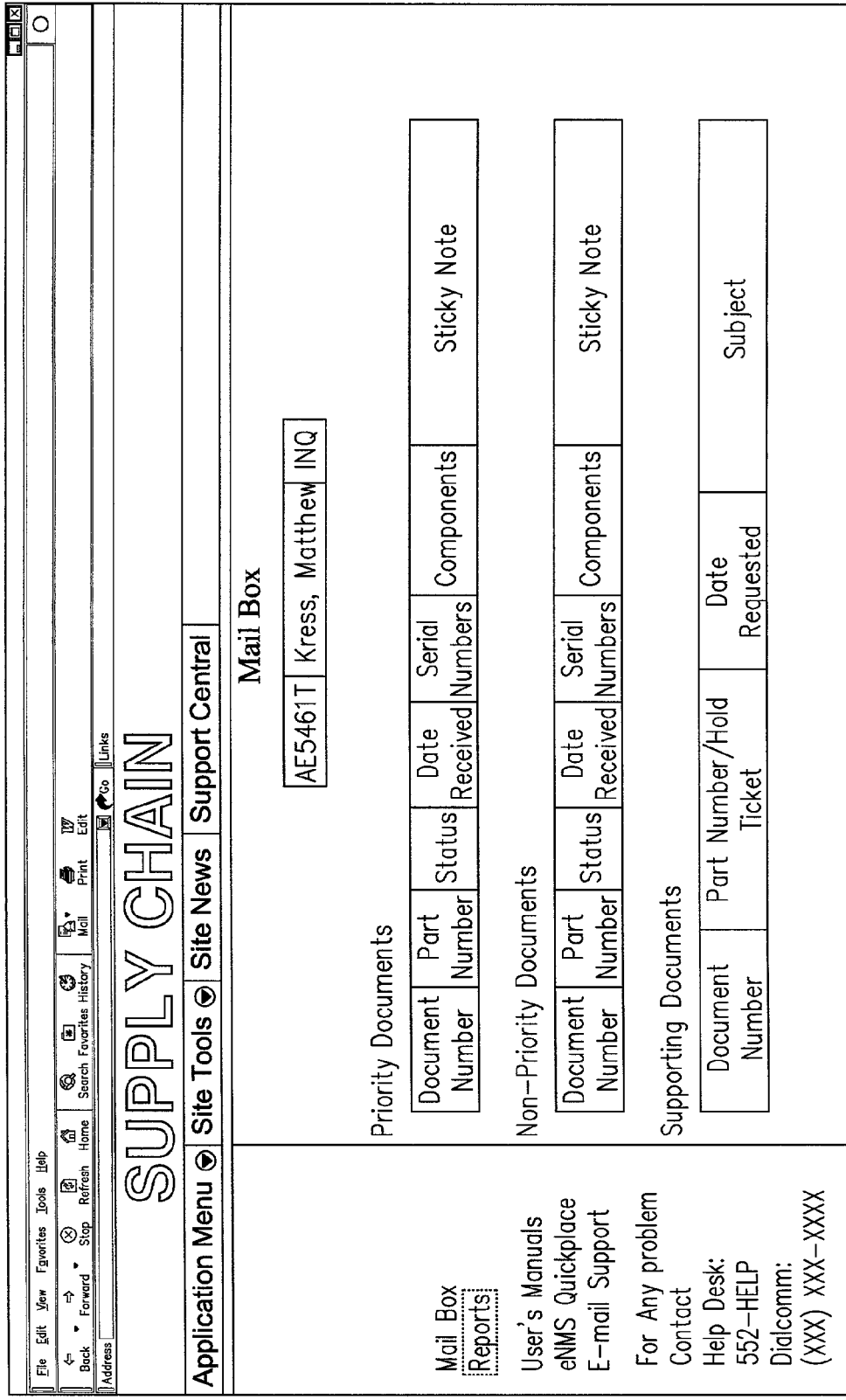
FIG. 8 is an exemplary embodiment of an assembly and test/component manufacturing web page accessible through the supply chain web-site shown in FIG. 4.

FIG. 8 is an exemplary embodiment of an assembly and test/component manufacturing web page 300 accessible through supply chain home page 100 (shown in FIG. 4). Web page 300 provides a user access to a single system that permits a plurality of internal and external users to enter, track, and collect data and disposition data of non-conformances that may have occurred during an assembly and test stage, or a component manufacturing stage of the supply chain process.

Figure 9:
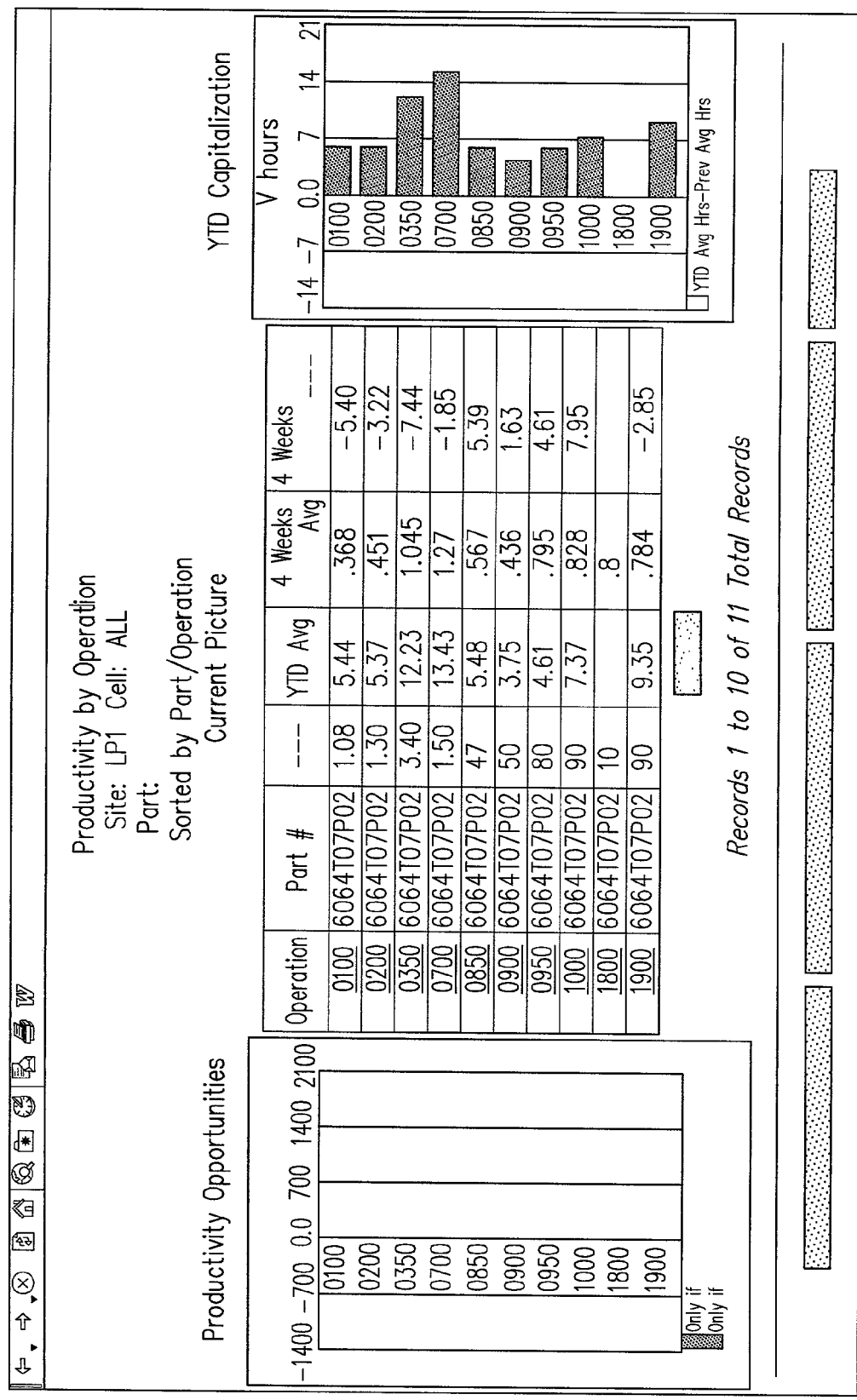
FIG. 9 is an exemplary embodiment of a component manufacturing web page accessible through the supply chain web-site shown in FIG. 4.

FIG. 9 is an exemplary embodiment of a component manufacturing web page 350 accessible through supply chain home page 100 (shown in FIG. 4). Web site 350 provides a user access to a manufacturing and assembly application that summarizes detailed historical performance data a pre-determined number of measurement categories. Furthermore, web page 350 enables a user to integrate future demand schedules to assess where improvement efforts should be focused.

Figure 10:
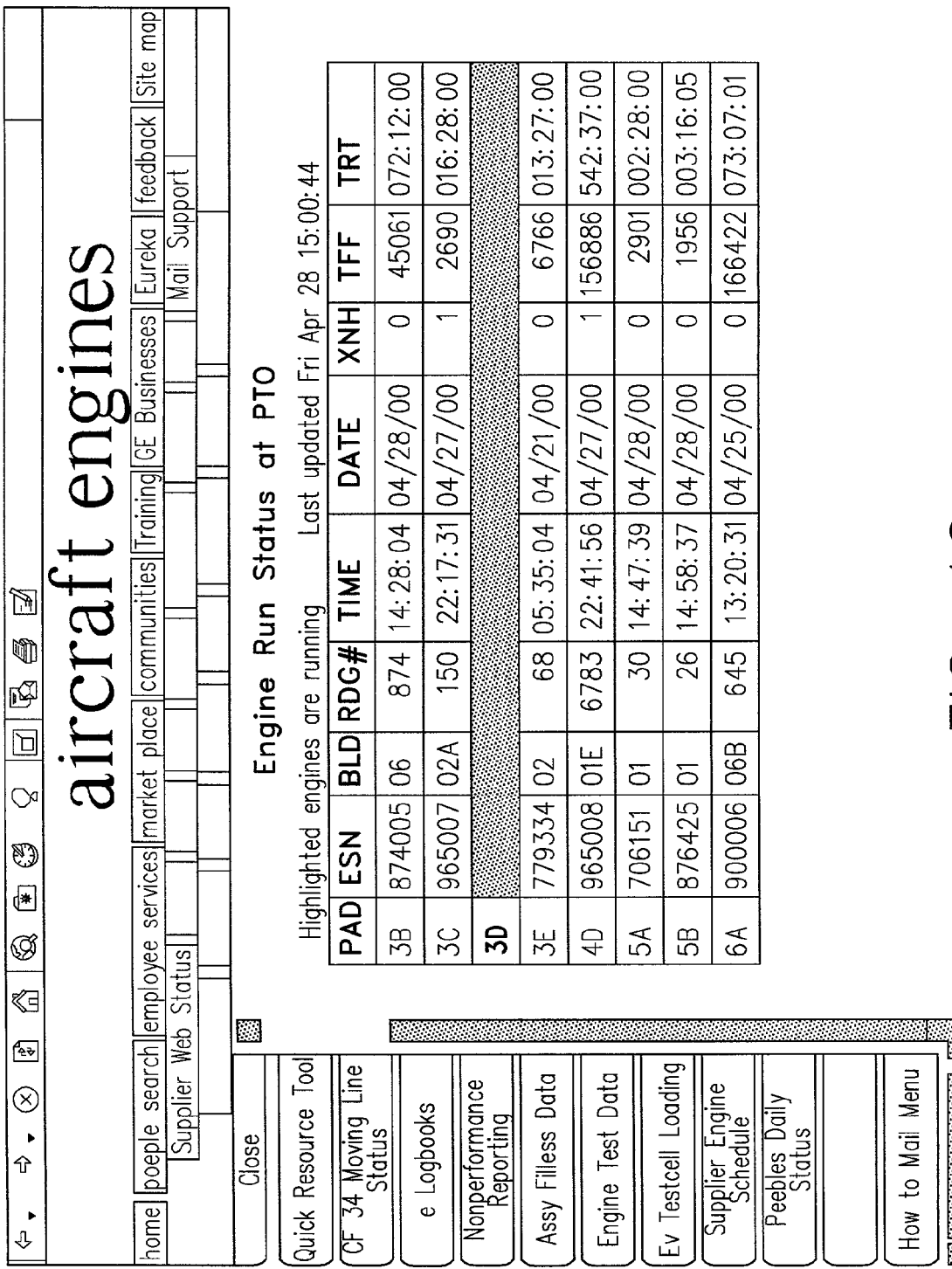
FIG. 10 is an exemplary embodiment of a component manufacturing/assembly and test web page accessible through the supply chain web-site shown in FIG. 4.

FIG. 10 is an exemplary embodiment of a component manufacturing/assembly and test web page 400 accessible through supply chain home page 100 (shown in FIG. 4). Web page 400 provides a user access to a system that maintains databases of manufacturing problems and solutions, to facilitate preventing future occurrences or to facilitate a quicker resolution should such problems re-occur in the future.

Figure 11:
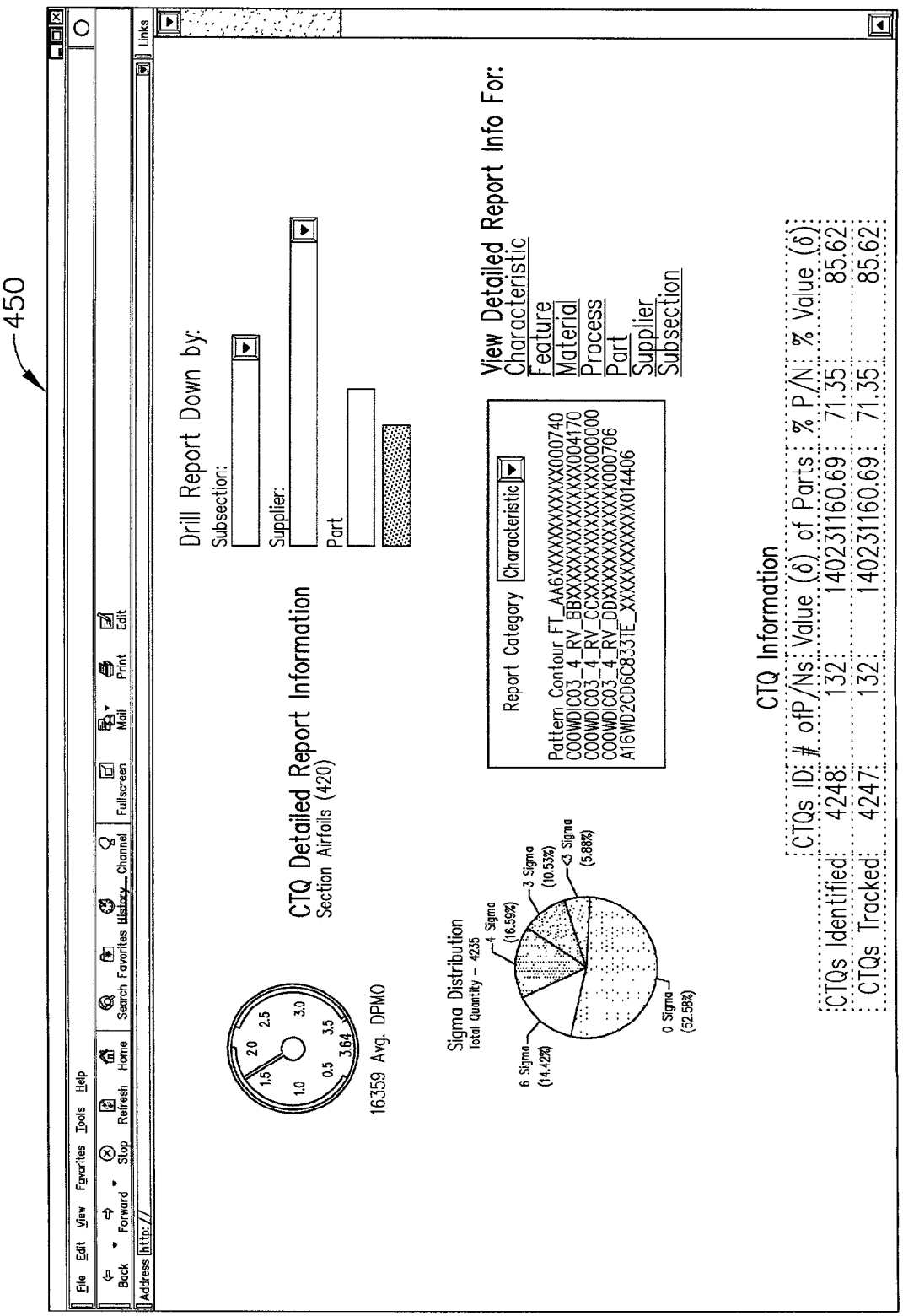
FIG. 11 is an exemplary embodiment of a component manufacturing web page accessible through the supply chain web-site shown in FIG. 4.

FIG. 11 is an exemplary embodiment of a component manufacturing/assembly and test/logistics web page 450 accessible through supply chain home page (shown in FIG. 4). Web page 450 provides a user access to a system for maintaining updated process capability data for part characteristics that are determined to be the most critical to the fit, form, or function, of an aircraft engine. Furthermore, the system enables a user to predict future non-conformances.

The above-described web-based supply chain system is cost-effective and highly reliable. The web-based supply chain system provides a single portal that is customized to individual client needs, and is configured to support a plurality of supply chain processes. Specifically, the web-based supply chain system provides a single entry point for a user to conduct all of their supply chain core processes through a central repository of extranet applications accessible from the system. The web-based supply chain system combines new technology, supply chain process specific applications, and customer and industry supply chain data to give users the ability to increase their productivity and minimize their supply chain costs by running process applications that develop their optimal supply chain performance requirements.

While the invention has been described in terms of various specific embodiments, those skilled in the art will recognize that the invention can be practiced with modification within the spirit and scope of the claims.

What is claimed is:

1. A web-based supply chain system for improving business productivity, said system comprising:
   a database comprising historical business information relating to one of a turbine engine and a turbine engine component;
   a server coupled in communication with said database, said server comprising at least one business transactional application including a plurality of user interfaces associated with said at least one business transactional application, said server configured to:
      prompt a user to enter business information relating to one of a turbine engine and a turbine engine component via at least one of said plurality of user interfaces, said server configured to store user inputs relating to one of the turbine engine and the turbine component in said database;
      prompt a user to access and retrieve said at least one business transactional application via a web page configured to provide access for a plurality of users internal to a business entity and to users external to the business entity to enable users to access data comprising at least one non-conformance that occurs during at least one of an assembly and test stage and a component manufacturing stage of a supply chain process; and
      prompt a user to select data relating to at least one of the turbine engine and the turbine engine component via said web page;
   at least one computer; and
   a network coupling said at least one computer to said server, and said database to said server.

2. A system in accordance with claim 1 wherein said business information database includes information relevant to a plurality of supply chain processes, said server further configured to store and download data relevant to at least one of the supply chain processes.

3. A system in accordance with claim 2 wherein said supply chain processes include at least one of demand planning, planning and scheduling, configuration management, order management, procurement, component manufacturing, assembly and test, logistics, and billing and collection.

4. A system in accordance with claim 2 wherein said server further configured to allow a user to:
   set and input inventory requirements; and
   monitor a suppliers availability to ship inventory.

5. A system in accordance with claim 2 wherein said server further configured to:
   provide data for buying and related activities including at least one of globalization, long-term agreements, and raw material purchasing; and
   integrate data from a plurality of purchase databases.

6. A system in accordance with claim 2 wherein said server further configured to track, store, and dispose data relating to non-conformances.

7. A system in accordance with claim 2 wherein said server further configured to:
   summarize historical performance data in pre-defined categories;
   integrate future demand schedules based on the summarized data; and
   predicts potential manufacturing problems based on the summarized data.

8. A system in accordance with claim 2 wherein said server further configured to:
   maintain process capability data for pre-determined part characteristics; and
   receive operational metrics requiring monitoring.

* * * * *